Nov. 5, 1974 E. L. GIBBS 3,846,295
METHOD AND APPARATUS FOR USE IN WATER PURIFICATION
BY REVERSE OSMOSIS
Filed April 6, 1972
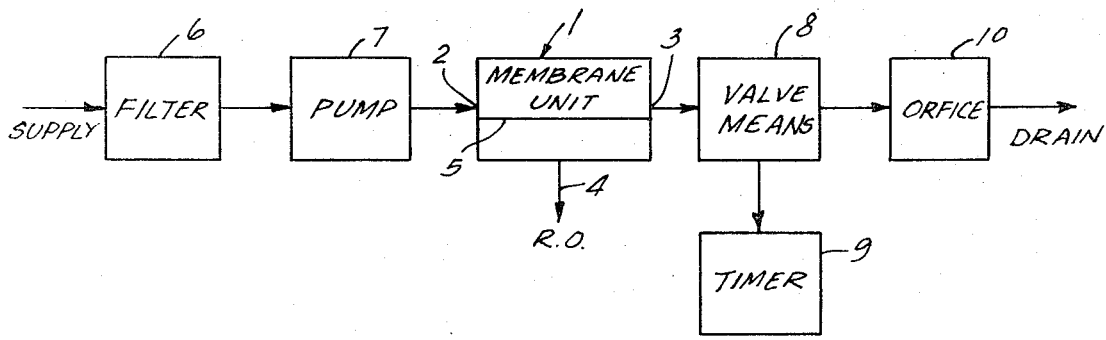
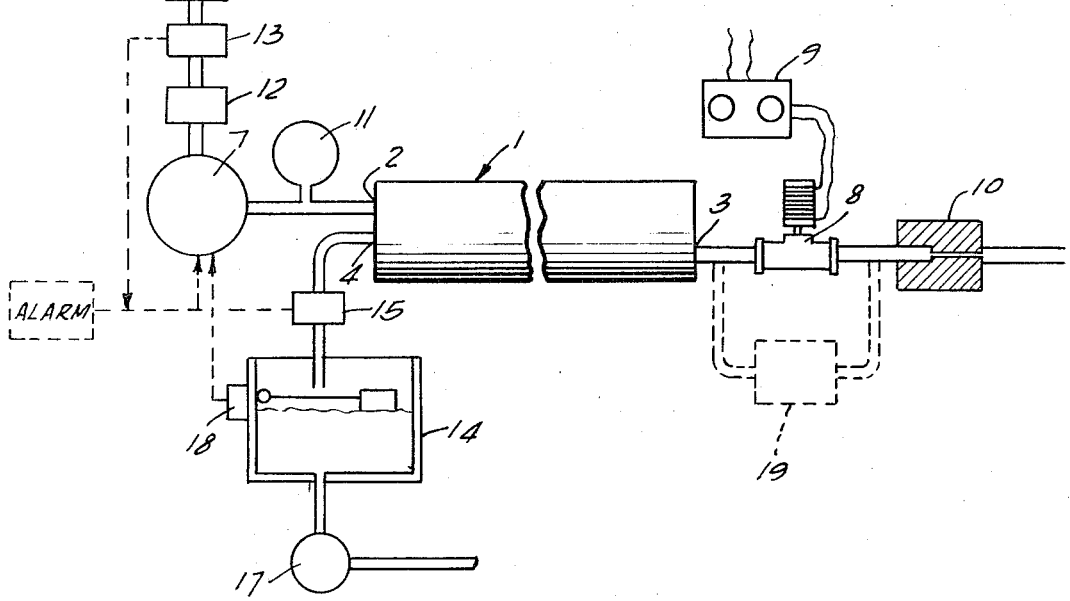

United States Patent Office 3,846,295
Patented Nov. 5, 1974

3,846,295
METHOD AND APPARATUS FOR USE IN WATER
PURIFICATION BY REVERSE OSMOSIS
Erich L. Gibbs, Wilmette, Ill., assignor to Ultrascience
Incorporated, Skokie, Ill.
Filed Apr. 6, 1972, Ser. No. 241,731
Int. Cl. B01d 13/00, 31/00
U.S. Cl. 210—23                                     20 Claims

ABSTRACT OF THE DISCLOSURE

A method of and an apparatus for water purification from a raw water (defined as naturally occurring or artificially contaminated) by reverse osmosis, in which a reverse osmotic flow is created through a membrane with the concentrate water forming at the input side of the membrane being withdrawn in a pulsed flow, with periods of maximum flow operative to provide flow turbulence over the membrane surface with sufficient flushing thereof adequate for prevention of excessive boundary layer formation at said membrane and suspension of particulate material in said concentrate water, and intermediate periods of at least a lesser concentrate water flow, preferably no net flow, said intermediate periods having a duration such that any boundary layer formation and particulate disassociation is materially countered by the maximum flow and period duration of the maximum flow period.

BACKGROUND OF THE INVENTION

The invention is directed to a method and apparatus for obtaining relatively pure water by utilization of the principle of reverse osmosis. The use of reverse osmosis in water purification has been steadily gaining in favor, and with improvements being continuously made in the fabrication of suitable membranes, the demand is constantly increasing.

Briefly, in the utilization of reverse osmosis, an impure solvent such as raw water, i.e., water containing solutes is conducted to a membrane which is permeable to water but impermeable or far less permeable to the majority of the solutes contained therein. In the practice of reverse osmosis a pressure is applied to the raw water which is greater, usually considerably, than the osmotic pressure of the water whereby the water flows through the membrane counter to the normal osmotic flow with the solutes being largely retained at the raw water of concentrate side of the membrane and resulting in a concentration thereat. It will be appreciated that this concentration can be a serious source of trouble. At worst, it may cause precipitation of one or more solutes and/or caking. At best, it results in increased osmotic pressure with a consequent decrease in effective pressure and a lowered recovery flow through the membrane as the greatest concentration of solutes will be immediately adjacent to the membrane. To minimize concentration effects, it has been deemed necessary in the past to provide a continuous flow across the concentrate sides of the membrane maintaining relatively high flow rates to insure sufficient turbulence necessary to eliminate a possible build-up of the solutes on the surface of the membrane. It is also known experimentally that a rapid flow of raw or concentrate water across the membrane surfaces increases the rate of water flow through the membrane, in view of which many devices have been produced in an effort to take advantage of this fact.

Where relatively small reverse osmosis capacities are involved, as for example, from 150 gallons to 1,000 gallons of reverse osmosis per day, additional problems arise when attempting to proceed in accordance with established considerations and techniques. It will be aparent that where relatively low product water flow rates are involved, the flow rate of the concentrate flowing continuously from the unit should also be low if the raw water is to be reasonably conserved, whereby instantaneous flow must be carefully adjusted, as for example by means of a needle valve or the like. Because of the relatively high pressures applied to the concentrate side of the membrane, usually in excess of 150 p.s.i., the orifice through which the concentrate must flow will be necessarily small. In fact, the orifice must be so small that the probability of the orifice becoming occluded is great. Continuing operation after plugging, even for a very short time, for example on the order of ten minutes or even less, may ruin the membrane or so damage it that reconditioning is necessary, and while reconditioning often times may be effected, a reconditioned membrane will normally lose some of its desirable characteristics. On the other hand, the continuous water flow cannot be unduly increased without resulting in a disadvantageous and undesirable ratio between the volume of recovery water to the volume of raw water with a corresponding undesirable efficiency level.

BRIEF SUMMARY OF THE INVENTION

The present invention is directed to elimination of the problems described, and in achieving this result proceeds contrary to the general accepted proposition that a predetermined minimum continuous water flow is essential to efficient operation whereby such water flow is sufficient to avoid the undesired build-up of boundary layers and to maintain particulate material in suspension.

This is accomplished in the present invention by suitably pulsing the concentrate water flow, wherein such flow is divided into periods of maximum flow and intermediate periods with at least a lesser flow, which may, particularly where small output volume is involved, be reduced to no flow. With this method, the operating parameters are so determined that, contrary to accepted theory, the periods of maximum flow involve a sufficient flow to provide adequate flow turbulence over the membrane surface with sufficient flushing thereof to prevent excessive boundary layer formation at the membrane and to maintain particulate material suitably in suspension in the concentrate water with the intermediate periods of a lesser or no concentrate flow being so dimensioned as to duration that any boundary layer formation or particulate disassociation resulting during such period is materially countered by the established flow and period duration of the maximum flow period.

The apparatus for practicing the invention may be very simple in construction, with the bulk of the components thereof being commercially procurable items.

A very efficient unit for small operations may be produced, utilizing commercially procurable membrane units, as for example tubular modules employing membrane elements of spiral configuration, in conjunction with suitable valve means in the concentrate water discharge line adapted to be operated by suitable timing means to provide desired durations of maximum and intermediate flow periods. The flow reducing orifice in the discharge line may be of any suitable construction, being formed either as a separate element, or as a part of the valve structure, i.e. either as a separate port in the valve body or being formed by the valve orifice itself. The apparatus may conveniently include additional equipment as for example, a suitable filter unit, a recovery water circulating pump, means for effecting a monitoring of the conductivity of the reverse osmosis recovery water, etc.

BRIEF DESCRIPTION OF THE DRAWINGS

In the drawings wherein like reference characters indicate like or corresponding parts;

FIG. 1 is a flow diagram illustrating the principles of the method of the present invention; and FIG. 2 is a semi-diagrammatic figure of apparatus for use in practicing the method of the invention.

DETAILED DESCRIPTION OF THE INVENTION

For the purposes of illustration the present invention will be described and details presented for a small capacity system, involving capacity of 2,000 gallons per day or less, to which type of system the present invention is particularly adapted.

Referring to FIG. 1, the reference numeral 1 indicates generally a membrane unit or structure, illustrated purely diagrammatically as a chamber having a fluid inlet 2 for the input solvent such as raw water, i.e., water and solutes, a concentrate water discharge opening 3 and an outlet 4 for the recovered water derived by reverse osmosis, i.e. RO water. Interposed between the inlet 2, concentrate outlet 3 and the recovery outlet 4 is a membrane 5. The unit 1 may be of standard commercial construction of which there are a number presently on the market. For example, one such unit, manufactured by Eastman Kodak Company, employs a spiral construction in which the membrane and suitable spacing, supporting and channel-producing materials are wrapped around a central tube in which recovery or product water is adapted to accumulate. The entire spiral structure is disposed within a suitable case or container to the interior of which communicate a raw water inlet and a concentrate water outlet. This type of unit is produced as a module which may be utilized with like modules to provide a desired capacity.

The inlet 2 is adapted to be supplied with raw water, preferably after passing through a filter 6 adapted to take out solids in the raw water with the latter being supplied to the unit 1 by a suitable pump 7 operatively connecting the output of the filter 6 with the inlet 2.

The outlet 3 for concentrate is illustrated as being connected to a valve 8 adapted to be controlled by suitable means, such as a timer 9, with the concentrate water passing through the valve being discharged through an orifice 10 to drainage means or the like.

It will be appreciated that in the operation of a reverse osmosis system of the general type described, it has, in the past, been common practice to maintain a continuous flow from the inlet 2 through the outlet 3. This has been necessary to insure removal of the concentrates left behind from the water passing through the membrane, which if not removed will result in serious damage to the membrane, at the minimum, requiring extensive reconditioning. The solution to this problem, in the past, has been to maintain a turbulent flow or to maintain flow rates sufficiently high to minimize residence time of the feed solvent at the membrane surface. It is also experimentally known that the rapid flow of raw or concentrate water across the membrane surface increases the rate of water flow through it. Consequently, it is not unusual to operate large capacity equipment at recoveries (ratio of input volume to RO output volume), ranging around 50%, depending, of course, upon the degree of purity required, and the other operational parameters employed.

It will be appreciated that where small capacity equipment is involved, for example 2,000 gallons per day or less, the minimum suggested concentrate water flows for the membranes are on the order of 2–3 gallons per minute. However, the rate of production of RO water may be on the order of .05 g.p.m., thus involving recovery ratios on the order to 1:40–60. From the standpoint solely of concentration and precipitation, it would appear that in most instances there is no need for such ratio to be less than .5 or .25. Thus, to insure maintenance of adequate turbulence by a continuous flow, a tremendous waste of water would normally be required for small reverse osmosis equipment. It will be appreciated that in addition to the above problem, there is that of maintaining the desired concentrate flows, particularly where the recovery ratio is low, for example .5, as the flow of water through the unit will be low and in turn the pressure drops involved will be high, for example, on the order of 150–300 p.s.i. or higher. Consequently, the controlling device in the concentrate water output line to limit flow, as for example a suitable orifice or the like, would have to be relatively very small, often taking the form of a needle valve. A problem is thus presented with respect to precipitates, debris and liming which can readily plug such a small opening. If plugging should occur, the membranes will be irreversibly damaged within a matter of minutes.

While it has been generally accepted that a continuous concentrate water flow is essential to satisfactory operation of an RO system, I have found that exceedingly favorable results can be obtained by utilizing a method of pulse-flow operations.

In practicing the method of the invention, the concentrate water flow from the membrane unit is cyclically varied, which may comprise alternate periods of flow and no flow, or alternate periods of relatively high and relatively low flow, with the periods of flow being greater than what would be normally utilized in a continuous flow operation and the periods of low flow being considerably less than such normal continuous flow.

It will be appreciated that in view of a wide possible range of operating parameters, each individual case will normally be controlled by its own operating parameters and nature of raw waters.

Contrary to existing concepts with respect to continuous flow, etc. cycles of no concentrate flow are readily practical provided the cyclic intervals are suitably selected with corresponding flow parameters. I have found that when properly dimensioned, a "pulse flow" control results, not only in a considerable reduction of dangers associated with reduced continuous flows, but a pronounced improvement in efficiency, not only in terms of recoveries but also in terms of a considerable increase in the life expectancy of the membranes. As previously mentioned, operational parameters will vary with the systems, their capacities, their desired recoveries and the nature and concentration of raw waters.

Considering small capacity equipment of the type previously referred to, I have found generally that expediently the total cycle may range from approximately 30 seconds to a maximum of approximately 3 minutes, with a maximum flow period of 90% (10% no flow) and 4% (96% no flow). Operating pressure in such case will normally range between 150–300 p.s.i. in fresh water applications with maximum concentrate flows of from 2–3 gallons per minute and recovery ratios of from .5 to .25. For example, under the pH conditions described, I have found that very efficient results can be obtained with a 200 gallon per day RO system operating on Chicago city water under average pH conditions utilizing a total cycle of 54 or 55 seconds with no concentrate flow taking place for a period of 50 seconds, followed by a concentrate flushing for 4–5 seconds. It will be appreciated that in such type of operation, the parameters of the flow are so selected to give the necessary flow turbulence during a flushing period. Tests have shown that in the case of small equipment, troublesome boundary conditions do not develop during short periods when there is no net flow of concentrate water, provided the "off" and "on" intervals are suitably selected. As relatively large flows may be involved during the flushing periods, any control equipment associated therewith, and in particular any controlling orifices can be sufficiently large so that plugging and the like is substantially avoided. Tests also have disclosed that the life expectancy of membranes, in the case of small equipment, can be greatly extended by the practice of the present method, i.e. from hours or weeks (where concentrate flow control of a continuous flow system becomes plugged) to years, with a considerable gain in operational efficiency as compared to continuous flow systems which compromise flushing and recovery ratios.

FIG. 2 diagrammatically illustrates apparatus for practicing the method of the invention in which the unit 1 may, for example, be of the spiral type, previously referred to, comprising a cylindrical unit having one axially disposed recovery water outlet 4 and a feed water inlet 2 disposed at one end thereof, and a concentrate outlet 3 disposed at the other end thereof. The solvent supply is passed through a filter 6, to the inlet side of the pump 7 from which it is supplied under pressure to the solvent inlet 2 of the unit 1, a suitable accumulator 11 being disposed in the line between the pump 7 and the inlet 2. Also disposed in the supply line, either before or following the pump 7, is a check valve 12 and a pressure-responsive switch 13. The filter 6 may, for example, be a 5-micron filter employing an in-line melamine filter cartridge, with the check valve 12 being operative to prevent a reverse flow through the filter and in the supply line in the event of the shut-down of the pump 7. The switch 13 may be operatively connected to suitable means as for example alarm and control circuits to provide a suitable alarm and fail-safe operation in the event pressure at the output of the filter 6 falls below a predetermined safe level either as the result of a clogged filter or a supply failure. The accumulator acts as a shock compensator and to maintain substantially uniform pressure in the system during operation.

The RO recovery water is adapted to flow from the outlet 4 into a receiving tank 14, suitably vented to the atmosphere to eliminate back pressure in the recovery line, which may also be provided with a conductivity sensing device 15 adapted to monitor the quality of the recovery water. The discharge outlet of the recovery tank 14 may be connected to a distribution line 16 having a distribution or repressurizing pump 17 inserted therein whereby the recovery water may be supplied under pressure to the desired points of use. To prevent a possible overflowing of the receiving tank 14, the latter may be provided with a float controlled switch 18 which may be inserted in the power line to the pump 7 to control the operation of the latter and thus shut off the pump 7 when the liquid level in the tank 14 has reached a desired maximum, and which may also actuate an alarm.

The concentrate discharge line 3 is operatively connected through a solenoid valve 8 and, if desired, through an orifice fitting 10 from which it is discharged to a drain or the like. In some cases such discharge may be conducted to additional recovery, filtering or other processing equipment.

The solenoid valve 8 is adapted to be controlled by the timer 9, both of which may be of generally standard construction, with the timer 9 being so constructed that periods of actuation and deactivation of the solenoid 8 may be individually selected for periods of "on" and "off" within the operational range according to the present invention.

In the particular embodiment illustrated, the solenoid valve 8 is depicted as of the open or shut type whereby no flow will take place during the closed period thereof, with the flow rate during open periods being determined by the orifice fitting 10. If a small flow were desired during the closed period of the valve 8, this could readily be accomplished by shunting the valve and orifice 10 with a similar orifice fitting 19, the orifice of which is proportioned to give the desired minimum flow.

It will also be appreciated, however, that the valve 8 may be especially designed for the specific purposes and thus having a maximum "open" flow orifice of a size to provide the desired maximum flow, in which case the fitting 10 could be omitted. In like manner, such a valve 8 could be readily proved with a suitable bypass opening of a size to provide a desired minimum flow when the valve is in its shut position, thus, either one or both of the orifices can be incorporated as a part of the valve structure.

It will also be appreciated that, in addition to the actuation of an alarm, the conductivity monitoring device 15, as well as the pressure sensing switch 13 may be arranged to provide a desired system condition in the event predetermined operating parameters do not exist. For example, the device 15 and switch 13 may be suitably circuited to shut down operation when the recovery water falls below a predetermined quality or the presence of undesired pressure conditions.

Having thus described my invention, it will be apparent from the above description that various immaterial modifications may be made in the same without departing from the spirit and scope of the invention.

I claim:

1. A method of solvent purification from an impure solvent by reverse osmosis, comprising the steps of supplying impure solvent at one side of a membrane, applying a pressure to said impure solvent sufficiently greater than the osmotic pressure thereof to produce a reverse osmotic flow through said membrane, and withdrawing concentrate forming at the input side of the membrane in a predetermined cyclic pulsed flow whereby the solvent flow across the input face of said membrane is likewise pulsed, restricting flow during periods of maximum flow to a predetermined amount which will not materially impair flow through the membrane, but which is operative to provide flow turbulence over the membrane surface with sufficient flushing thereof adequate for prevention of excessive boundary layer formation at said membrane and suspension of particulate material in said concentrate, and intermediate periods of at least a lesser concentrate flow, any flow during said intermediate periods being substantially uniform and materially less than that necessary to provide such a flow turbulence and flushing action, and said intermediate periods having a predetermined duration such that any boundary layer formation and particulate disassociation during such intermediate periods is materially countered by the maximum flow and period duration of the maximum flow period.

2. A method according to claim 1, wherein no concentrate net flow takes place during said intermediate periods.

3. A method according to claim 1, wherein said solvent is water, and said maximum flow periods have a duration percentage of from 4 to 90% and said intermediate periods of from 96% to 10%.

4. A method according to claim 1, wherein said solvent is water, and each cycle of a maximum flow period and an intermediate flow period has a duration of from 30 seconds to 3 minutes.

5. A method according to claim 4, wherein said maximum flow periods have a duration percentage of from 4 to 90% and said intermediate periods of from 90% to 10%.

6. A method according to claim 5, wherein no concentrate water flow takes place during said intermediate periods.

7. A method according to claim 4, wherein with approximately 50% volumetric recovery flow, at a rate approximately .05–2 gal./minute, the periods of minimum flow have a duration of approximately 50 seconds and the periods of maximum flow of 2–3 g.p.m. have a duration of between 25 and 45 seconds.

8. A method according to claim 7, wherein said applied pressure is from approximately 150 p.s.i. to 300 p.s.i.

9. A method according to claim 8, wherein no concentrate water flow takes place during said intermediate periods.

10. In an apparatus for solvent purification utilizing a pulsed reverse osmosis, with periods of predetermined maximum flow and intermediate periods of minimum or no flow, the combination of at least one membrane unit comprising a container having an inlet for impure solvent, a concentrate outlet and an outlet for recovery solvent, a membrane operatively disposed between said recovery outlet and the inlet and concentrate outlet, a supply line for impure solvent operatively connected to the solvent inlet under a pressure greater than the osmotic pressure of the solvent, a drainage line operatively connected to said concentrate outlet, arranged to discharge concentrate from the apparatus, by means of which a solvent flow across the input face of the membrane may be produced, means in said drainage line forming a restricted orifice for restricting concentrate flow through said drainage line to a predetermined maximum at which flow is limited substantially to that merely sufficient to insure that flow through the membrane is not materially impaired, and which is operative to provide a flow turbulence over the membrane input surface with sufficient flushing thereof adequate for prevention of excessive boundary layer formation at said membrane, and suspension of particulate material in said concentrate, valve means, having open and closed positions, disposed in said drainage line, in operative series with said flow-restricting means, for controlling the periods of maximum flow through said drainage line, and intermediate periods of at least a lessor flow, and timing means for controlling the open and closed positions of said valve means to provide a pulsed flow through said drainage line, and thereby produce predetermined cyclic periods of such maximum flow therethrough, and predetermined cyclic intermediate periods therebetween, said valve means being operable in closed position to further restrict flow through said drainage line, whereby any flow therethrough during intermediate periods is materially less than that necessary to provide said flow turbulence and flushing action.

11. Apparatus according to claim 10, comprising in further combination a check valve disposed in the impure solvent supply line operative to prevent a reverse flow therein and an accumulator disposed in said impure solvent supply line between the pump outlet and the inlet of the membrane unit.

12. Apparatus according to claim 10, wherein said valve means comprises a solenoid valve and said timing means comprises an electric timer which controls energization or deenergization of said solenoid valve.

13. Apparatus according to claim 10, comprising in further combination, a receiving tank into which water from said recovery outlet is conducted, and means responsive to a predetermined amount of water in said receiving tank for controlling the operation of the apparatus.

14. Apparatus according to claim 13, comprising in further combination, a pressure pump disposed in an outlet line from said receiving tank, for supplying recovery water therefrom under pressure.

15. Apparatus according to claim 13, comprising in further combination, means arranged in the line from the recovery outlet of said membrane unit to said receiving tank, for monitoring the conductivity of the recovery water, passing through said line.

16. Apparatus according to claim 15, wherein said conductivity monitoring means is arranged to shut down the pump when the conductivity of the recovery water reaches a predetermined maximum.

17. Apparatus according to claim 15, wherein said conductivity monitoring means is arranged to actuate alarm means when the conductivity reaches a predetermined maximum.

18. Apparatus according to claim 10, wherein said orifice means comprises a separate fitting in the concentrate line.

19. Apparatus according to claim 10, wherein said orifice means is incorporated in the valve means as a part thereof.

20. Apparatus according to claim 10, wherein said valve means is operative in closed position to prevent flow therethrough, and said orifice means comprises a separate fitting in the concentrate line, and second orifice means operatively by-passing said valve, constructed to permit a predetermined flow of concentrate when said valve is in closed position, less in volume than that of the operative flow through said first orifice means when said valve means is in open position.

References Cited

UNITED STATES PATENTS

| | | | |
|---|---|---|---|
| 3,541,004 | 11/1970 | Cooper et al. | 210—19 |
| 3,541,005 | 11/1970 | Strathmanh et al. | 210—19 |
| 3,716,141 | 2/1973 | Spatz | 210—321 X |
| 3,716,143 | 2/1973 | Clark | 210—321 |
| 3,719,593 | 3/1973 | Astil | 210—321 X |
| 3,505,216 | 4/1970 | Kryzer | 210—321 X |
| 3,365,061 | 1/1968 | Bray | 210—321 X |
| 3,390,773 | 7/1968 | Merten | 210—321 X |
| 3,552,566 | 1/1971 | Lowe et al. | 210—134 X |
| 3,552,574 | 1/1971 | Lowe et al. | 210—23 X |
| 1,825,631 | 9/1931 | Horvath | 210—321 X |
| 3,355,382 | 11/1967 | Huntington | 210—321 X |
| 3,670,892 | 6/1972 | Baerg et al. | 210—134 |
| 2,928,499 | 3/1960 | Nallinger | 210—134 X |
| 3,630,378 | 12/1971 | Bauman | 210—257 |

OTHER REFERENCES

Gouveia et al., "Potable Water From Hospital Wastes by Reverse Osmosis," from *Chem. Eng. Progress Symposium Series*, vol. 64, No. 90, 1968, copy in GP. 176, pages 280–284.

FRANK A. SPEAR, JR., Primary Examiner

U.S. Cl. X.R.

210—134, 136, 138, 257, 321